March 13, 1928.

H. JESCHKE

VALVE FOR PNEUMATIC TOOLS

Filed Nov. 6, 1926

Inventor
H. Jeschke
by
W. E. Evans
Attorney

Patented Mar. 13, 1928.

1,662,576

UNITED STATES PATENT OFFICE.

HERBERT JESCHKE, OF DUISBURG, GERMANY, ASSIGNOR TO DEMAG AKTIENGESELLSCHAFT, OF DUISBURG, GERMANY.

VALVE FOR PNEUMATIC TOOLS.

Application filed November 6, 1926, Serial No. 146,733, and in Germany September 15, 1925.

The valves hitherto employed for controlling pneumatic tools, and which have been designed for the economical use of compressed air, have the disadvantage that either the valve is highly complicated or, if it is not complicated, the striking piston that controls the valve loses its simple form and becomes comparatively weighty, whereby the speed of striking is reduced while the tool is increased in weight. In the mass production of pneumatic tools, however, it is of the greatest importance that the tools shall be produced as simply as possible without, however, affecting the efficiency of the joints between the respective moving parts. In valves that are designed for the economical use of compressed air several differential surfaces are necessary, and consequently several tightly fitting peripheral surfaces of different diameters. Experience has, however, demonstrated that it is almost impossible to secure an efficient joint between these different peripheral surfaces, more particularly as it is generally necessary that parts of the tool may be replaced without fitting. The faulty fitting between these complicated valve parts results in an increase in the consumption of compressed air, while at the same time the output of the tool is reduced. In contra-distinction to these valves, valves are also known, in which the peripheral surfaces to be fitted are of the same diameter.

It has before been proposed to provide a valve for a pneumatic tool, which valve is moved in one direction by the pressure of air compressed in front of the returning piston and is moved in the other direction by means of a spring bearing against one end face of the valve when the pressure upon the opposite end face of the valve is neutralized by the opening of a passage by the piston on the percussion stroke, whereby communication between the space in front of the latter end face of the valve and an annular recess in the valve forming an opposed differential surface is established.

According to the invention in a pneumatic tool having a slide valve moved in one direction by a spring and reversed when the piston is making its return stroke by air compressed in front of the piston, the reversal of the valve during the percussion stroke is effected solely by the pressure of the spring upon one end face of the valve, for which purpose the opposite end faces of the valve are of substantially the same area and communication between the space between the valve and the piston and the space in front of the end face of the valve against which the spring bears is established by the piston during the percussion stroke.

The valve can be used for all kinds of pneumatic tools. In order to warrant a positive starting of the hammers, it is advisable either to connect a space, which is continuously under the pressure of fresh air, or a space, which during the return stroke stands under fresh air, (e. g. valve shell) by a small bore with the rear cylinder space.

In drills that reverse automatically this auxiliary connection has still greater importance, in that frequently when the boring tool becomes held in the bore hole, the piston does not make its normal return stroke, and the compression in the cylinder space behind the piston is not brought to a sufficiently high point to ensure reversal. Thus there is the danger that the piston will cease to operate. If, however, compressed air enters the cylinder space behind the piston through the auxiliary passage above referred to, the pressure increases in a very short space of time to such a degree that reversal is effected and the percussion stroke is commenced.

Two constructions of the apparatus according to the invention are diagrammatically illustrated by way of example in longitudinal section in the accompanying drawing.

Figure 1:
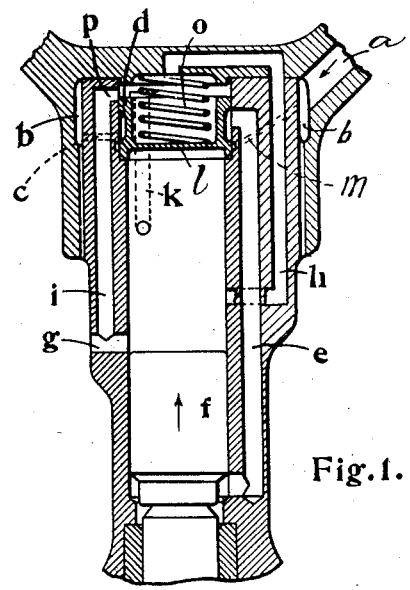
Figure 1 illustrates the use of the valve according to the invention in a pneumatic tool such as a pick at the commencement of the return stroke.
Figure 2:
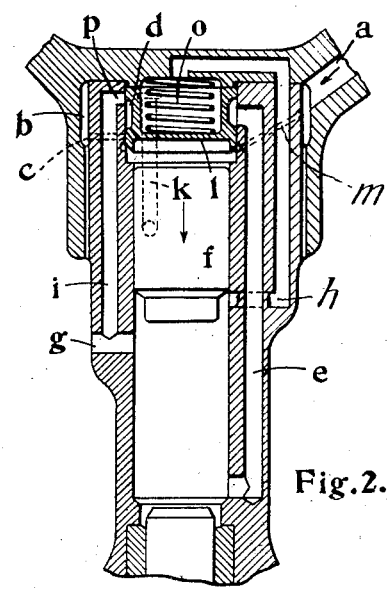
Figure 2 shows the hammer at the commencement of the percussion stroke of the piston.

With reference to Fig. 1, compressed air passes through the passage $a$ into the annular passage $b$, through the holes $c$, the annular recess $d$ in the valve body $l$, through the passage $e$ and thus below the percussion piston $f$ whereby the latter is driven upwards. In the meanwhile the cylinder space above the piston has commenced to discharge its air through the exhaust passages $g$, then through the valve passage $h$ and the compression passage $k$ through the space above the valve, with which said latter passages communicate into the exhaust passages $i$ and $g$. When in the return movement of the piston $f$ the upper edge of the piston covers the compression passage $k$, the air in the space above the piston is compressed and forces the slide valve $l$ upwardly against the valve springs $o$. At the same time the space below the piston is emptied of air through the exhaust passages $g$. The piston $f$ is brought to a standstill and reverses its direction of movement. In the percussion stroke (Figure 2) compressed air passes from the passage $a$ through the annular passage $b$ and the holes $m$ to a position above the piston $f$ and drives it downwardly. The air below the piston, after the latter passes the exhaust port $g$ escapes through the passage $e$, the annular passage $d$ in the valve shell $l$, the port $p$ and the exhaust passages $i$ and $g$.

When the upper edge of the piston $f$ uncovers the passage $h$, the space above the piston is in communication with the space above the valve $l$ and the two spaces are then under equal pressure; the valve spring $o$ is then able to press the slide valve $l$ downwardly and thus produce its return stroke. When the percussion piston strikes the tool the air at the rear of the piston escapes through the exhaust passages $g$ and the cycle of operations is repeated.

Figure 3:
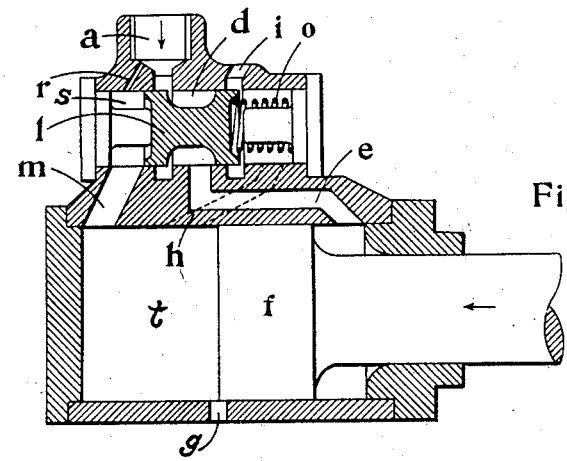
Figure 3 shows how a percussion boring tool can be provided with the valve according to the invention.

The valve on the drilling tool illustrated in Figure 3 is operated in similar manner. The reference letters shown in this drawing correspond to those used in Figures 1 and 2, the auxiliary passage hereinbefore described being represented by the reference letter $r$. This auxiliary passage $r$ connects the inlet passage $a$ for the compressed air with the slide valve cylinder space $s$ and the air from passage $r$ enters this space and also passes through passageway $m$ into the space $t$ in the working cylinder at the rear of piston $f$. The air drives the valve $l$ to the right against the action of the spring $o$ and the valve cuts off communication between the inlet $a$ and the passageway $e$ leading to the front end of the cylinder. When the piston $f$ moves outwardly compressed air from the space $t$ flows through passageway $h$ to the right of the valve $l$, and the pressures are thus equalized on both sides of the valve, and the spring reverses the slide valve. The air at the rear of the piston $f$ then exhausts through passageway $g$, and compressed air enters the front end of the cylinder through passageway $e$ and returns the piston. If the boring tool becomes fixed in the bore hole, as heretofore referred to, and does not complete its return stroke, compressed air continuously passes through passageway $r$ and effects reversal of valve $l$ and of the piston and the latter operates out with a shorter stroke.

I claim:

In a percussive tool the combination of a cylinder, a valve chest having communication with opposite ends of said cylinder and having a port adjacent one end communicating with a source of operating fluid and an exhaust port communicating with the opposite end, a cylindrical valve slidably mounted in said valve chest and adapted to control communication between said source of compressed fluid and opposite ends of said cylinder, a spring operatively engaging one side of said valve and serving to normally hold said valve in position to close communication to one end of said cylinder, said cylinder having a piston controlled relief port and a piston controlled pressure equalizing port each normally communicating with said valve chest on the spring pressed side of said valve, whereby fluid pressure is equalized on opposite sides of said valve during the major portion of the travel of said piston toward the end of said cylinder normally closed by said valve under the action of said spring, until said pressure equalizing port is covered by said piston, permitting sufficient fluid pressure to be built up under said valve to cause said valve to move in said valve chest to reverse the direction of flow of said operating fluid.

HERBERT JESCHKE.